(12) United States Patent
Zhao (10) Patent No.: US 11,349,896 B2
(45) Date of Patent: May 31, 2022

(54) OPTIMAL STRATEGY FOR DATA REPLAY IN A COMPLEX MULTIPLEXING NETWORK

(71) Applicant: salesforce.com, inc., San Francisco, CA (US)

(72) Inventor: Yingwu Zhao, Lafayette, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/066,832

(22) Filed: Oct. 9, 2020

(65) Prior Publication Data

US 2021/0029186 A1 Jan. 28, 2021

Related U.S. Application Data

(63) Continuation of application No. 15/827,998, filed on Nov. 30, 2017, now Pat. No. 10,805,373.

(51) Int. Cl.
| | |
|---|---|
| *H04L 65/60* | (2022.01) |
| *H04L 65/612* | (2022.01) |
| *H04L 5/02* | (2006.01) |
| *G06F 12/0811* | (2016.01) |
| *G06F 16/957* | (2019.01) |
| *H04W 4/38* | (2018.01) |

(52) U.S. Cl.
CPC ........ *H04L 65/604* (2013.01); *G06F 12/0811* (2013.01); *G06F 16/9574* (2019.01); *H04L 5/023* (2013.01); *H04L 65/4084* (2013.01); *H04W 4/38* (2018.02)

(58) Field of Classification Search
CPC ............. G06F 12/0811; G06F 16/9574; H04L 5/023; H04L 65/4084; H04L 65/604; H04L 67/2833; H04L 67/2842; H04W 4/38; H04W 4/70
See application file for complete search history.

(56) References Cited

U.S. PATENT DOCUMENTS

| | | | | |
|---|---|---|---|---|
| 6,160,814 A | * | 12/2000 | Ren ..................... | H04L 12/5601 370/427 |
| 6,240,094 B1 | * | 5/2001 | Schneider ............. | H04L 1/0002 370/412 |
| 2004/0078450 A1 | * | 4/2004 | Chen ..................... | H04L 67/327 709/214 |

* cited by examiner

*Primary Examiner* — Gil H. Lee
(74) *Attorney, Agent, or Firm* — Butzel Long (57) ABSTRACT

The technology disclosed relates to accelerating replay access to numerous streams via a channel aggregation hierarchy, muxing events from input buffers that receive event streams, into a physically aggregated stream in memory. A subscriber accesses events from the streams via the channel hierarchy; demuxing the physical aggregated stream and caching the events from the physical aggregated stream into event cache memory; caching references to selected events, which belong to active channels that have subscribers, in a caching structure including channel cache lists of the references, the caching structure including stream level channel cache lists, intermediate level channel cache lists, and, if the physical aggregate channel has subscribers, a physical aggregate channel cache list; and receiving a replay access request that specifies a channel and that specifies a starting point for the replay, and responsively delivering events from the event cache memory using a cache list corresponding to the specified channel.

20 Claims, 6 Drawing Sheets

OPTIMAL STRATEGY FOR DATA REPLAY IN A COMPLEX MULTIPLEXING NETWORK

RELATED APPLICATIONS

This application is related to U.S. patent application Ser. No. 15/052,822 entitled "EFFICIENT ACCESS SCHEDULING FOR SUPER SCALED STREAM PROCESSING SYSTEMS," filed on Feb. 24, 2016 (Attorney Docket No. SALE 1145-1/1694US). The related application is hereby incorporated by reference for all purposes.

This application is related to U.S. patent application Ser. No. 15/052,806 entitled "CACHE BASED EFFICIENT ACCESS SCHEDULING FOR SUPER SCALED STREAM PROCESSING SYSTEMS," filed on Feb. 24, 2016 (Attorney Docket No. SALE 1146-1/1698US). The related application is hereby incorporated by reference for all purposes.

The present application and these related applications are commonly assigned or subject to assignment to salesforce.com.

FIELD OF THE TECHNOLOGY DISCLOSED

The technology disclosed relates generally to data replay in complex multiplexing networks with intelligent cache buffer management, to hundreds, thousands, tens of thousands and millions of events and clients.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience.

The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

The problem exists of retrieving and replaying the data efficiently. The technology disclosed reduces computational complexity and latency when responding to replay requests and to queries for events multiplexed through a hierarchy of channels.

Therefore, an opportunity arises to provide systems and methods that support streaming to numerous channels with replay from event identifiers (IDs). Increased revenue, higher user retention, improved user engagement, and experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

To address the technical challenges of retrieving and replaying data efficiently, the technology disclosed offers a method of accelerating replay access to numerous streams via a channel aggregation hierarchy that includes multiplexing, from at least 100 input buffers that receive event streams, into a physically aggregated stream in memory. A subscriber is permitted to access events from the streams via a stream level channel, a physical aggregate level channel or an intermediate level channel that aggregates stream level channels and contributes to the physical aggregate level channel. The method includes demultiplexing the physical aggregated stream and caching the events from the physical aggregated stream into event cache memory; caching references to selected events, which belong to active channels that have subscribers, in a caching structure including channel cache lists of the references, the caching structure representing the channel aggregation hierarchy, including stream level channel cache lists, intermediate level channel cache lists, and, if the physical aggregate channel has subscribers, a physical aggregated channel cache list. The method also includes receiving a replay access request that specifies a channel at one of the stream level, intermediate level or physical aggregate channel and that specifies a starting point for the replay, and responsively delivering events from the event cache memory using a cache list corresponding to the specified channel Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

An event is any identifiable unit of data that conveys information about an occurrence or entity. An event can have three aspects: a timestamp indicating when the event occurred; a set of dimensions indicating various attributes about the event; and a set of metrics related to the event. Events can be user-generated or system-generated. An event typically represents some message, token, count, pattern, value, or marker that can be recognized within a NRT data stream, such as network traffic, specific error conditions or signals, thresholds crossed, counts accumulated, and so on. This application, in some implementations, interchangeably refers to "events" as "data", and vice-versa.

A huge challenge for enterprise platforms is to be able to replay specific event data from the massive quantity of data that gets cached from the millions of IoT devices and web applications. The challenge is largely a result of the combination of the multiplexing of events from many clients and the need for an ability to replay events.

The traditional solution allows clients to continue fetching the newest events from physical terminal channels: de-multiplexing and sorting the events into corresponding channels, and delivering to the clients along the way. However, event delivery without replay is inherently non-durable. That is, if a client loses network access briefly and re-subscribes, they lose all the data for the time window during which they were disconnected.

The technology disclosed manages caching of hierarchical channels of events from numerous channels, such as incoming messages from IoT devices. Hierarchical channels allow subscribers to receive streaming events from individual channels/topics or from aggregations of topics. Design of a cache to support aggregated channels is challenging. The technology disclosed involves initially muxing events that have been received and building a specific cache structure from demuxed events, instead of building a cache in parallel with the muxing. This somewhat counterintuitive approach has been proven to support very high event processing throughput and efficient cache management. Demuxing and demultiplexing are used interchangeably in this document.

Having the ability to replay is the key feature for allowing clients to have a durable data stream. Then, in the case of disconnect, the client can subscribe to the previously dropped-off event ID to resume to receiving the data with no gap or loss.

Two major difficulties arise when supplying replay service to clients. First, high-throughput clients tend to dominate the traffic, resulting in unacceptably poor performance for low-throughput clients. An example of this issue is described with respect to channel structure hierarchy shown in FIG. 3 and described infra. The second problem with the traditional solution is that, while replaying, the system would need to de-multiplex all the same one million events for each client to find out which subset can be delivered to which client. The de-multiplexing cost is compounded per client, hence preventing the system from being scalable with respect to the number of clients.

To address these technical challenges, the technology disclosed offers systems and methods for accelerating replay access to numerous streams via a channel aggregation hierarchy, by creating and maintaining a cache system that corresponds to the topology of a disclosed multiplexing network as well as the current subscribers, as described next.

Figure 1:
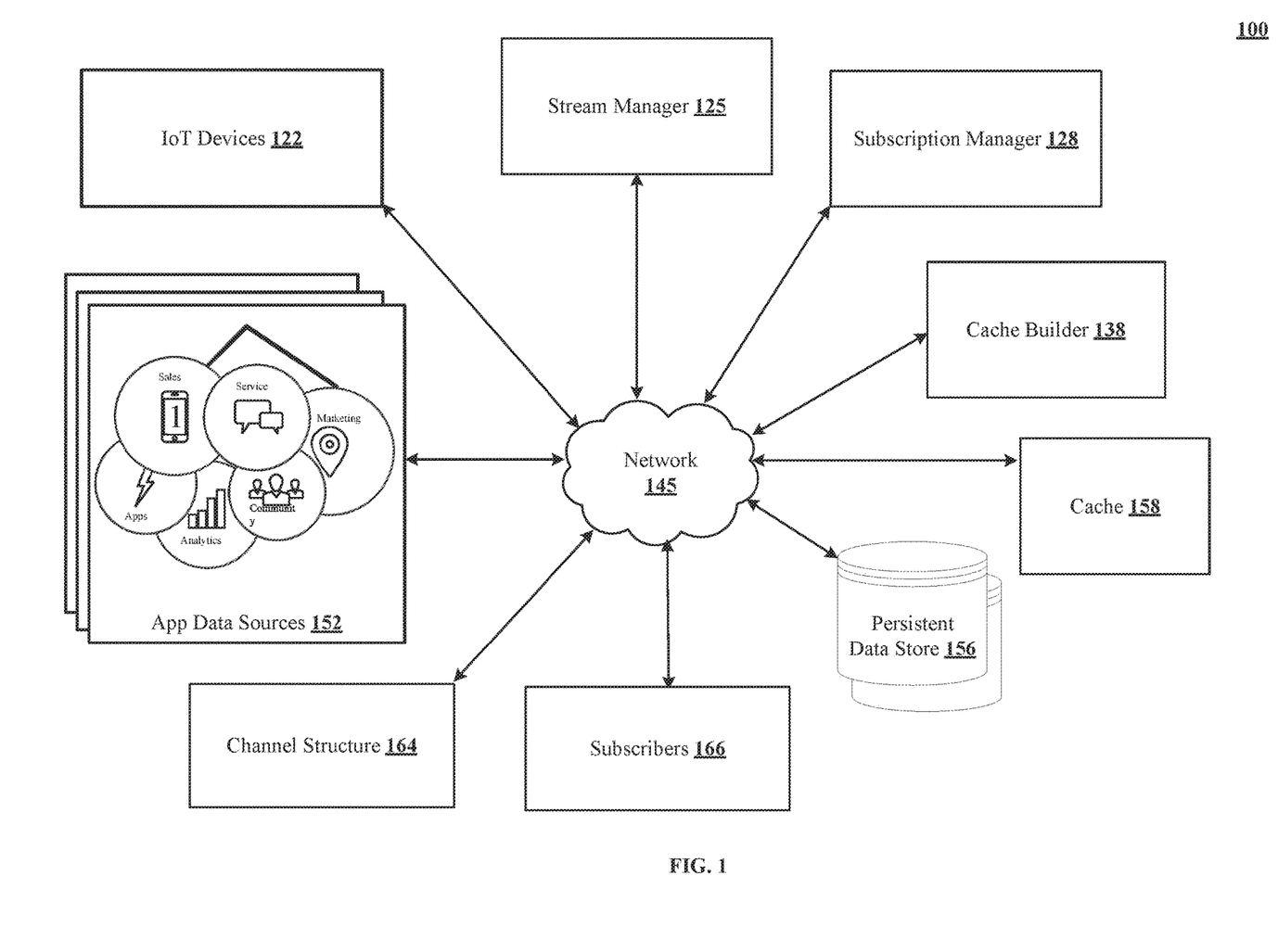
FIG. 1 depicts an exemplary system for accelerating replay access to numerous streams via a channel aggregation hierarchy.

FIG. 1 shows architecture 100 for accelerating replay access to numerous data streams via a channel aggregation hierarchy. Architecture 100 includes stream manager 125 for managing receipt of data streams generated by IoT devices 122 and application data source(s) 152 which include various software-as-a-service (SaaS), platform-as-a-service (PaaS) and infrastructure-as-a-service (IaaS) offerings for sales, service, marketing, analytics and communication. Architecture 100 runs on a distributed system, typically, among a multitude of servers—in one example, one hundred servers.

Real-time event signals emanate from product sensors inside automobiles, inside homes, on security systems, and in many additional places in the physical environment. Signals from the industrial internet emanate from sensors on equipment and machines that require monitoring, maintenance and repair. In order to capture the high-volume and high-speed data signals generated by IoT devices 122, a digital watchdog monitors the signal inputs, and when anything significant happens with the digital signals, registers an event. A very simple example of an event is when a temperature sensor goes off in an automobile to warn of freezing conditions outside.

IoT devices 122 and application data source(s) 152 are data source entities such as a smart phone, a WiFi access point, a sensor or sensor network, a mobile application, a web client, a log from a server, a social media site, etc. In one implementation, the event data can accessed via an application programming interface (API) that allows sensors, devices, gateways, proxies and other kinds of clients to register data sources so that data can be ingested from them. Data from the data sources can include events in the form of structured data (e.g. user profiles and the interest graph), unstructured text (e.g. tweets) and semi-structured interaction logs. Examples of events include device logs, clicks on links, impressions of recommendations, numbers of logins on a particular client, server logs, user's identities (sometimes referred to as user handles or user IDs and other times the users' actual names), content posted by a user to a respective feed on a social network service, social graph data, metadata including whether comments are posted in reply to a prior posting, events, news articles, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

Application data sources 152 stream data signals emanating in real-time from mobile devices such as smartphones and consumer wearables like the Fitbit and Apple Watch. Major gushers of data streams include connected consumer products and industrial equipment and machines. In some disclosed systems, terabytes of events per hour arrive for processing. One event injection occurs on a single server among the multitude of servers of the distributed system of architecture 100.

The data streams flowing in are not suitable for traditional database storage such as relational databases using structured query language. Instead, architecture 100 includes stream manager 125, subscription manager 128 and cache builder 138 as elements for handling and storing the very large data sets. "Cache Based Efficient Access Scheduling for Super Scaled Stream Processing Systems", which describes a stream processing system that uses an unbounded data stream or a message store for servicing a plurality of clients, is incorporated by reference in this application.

Figure 3:
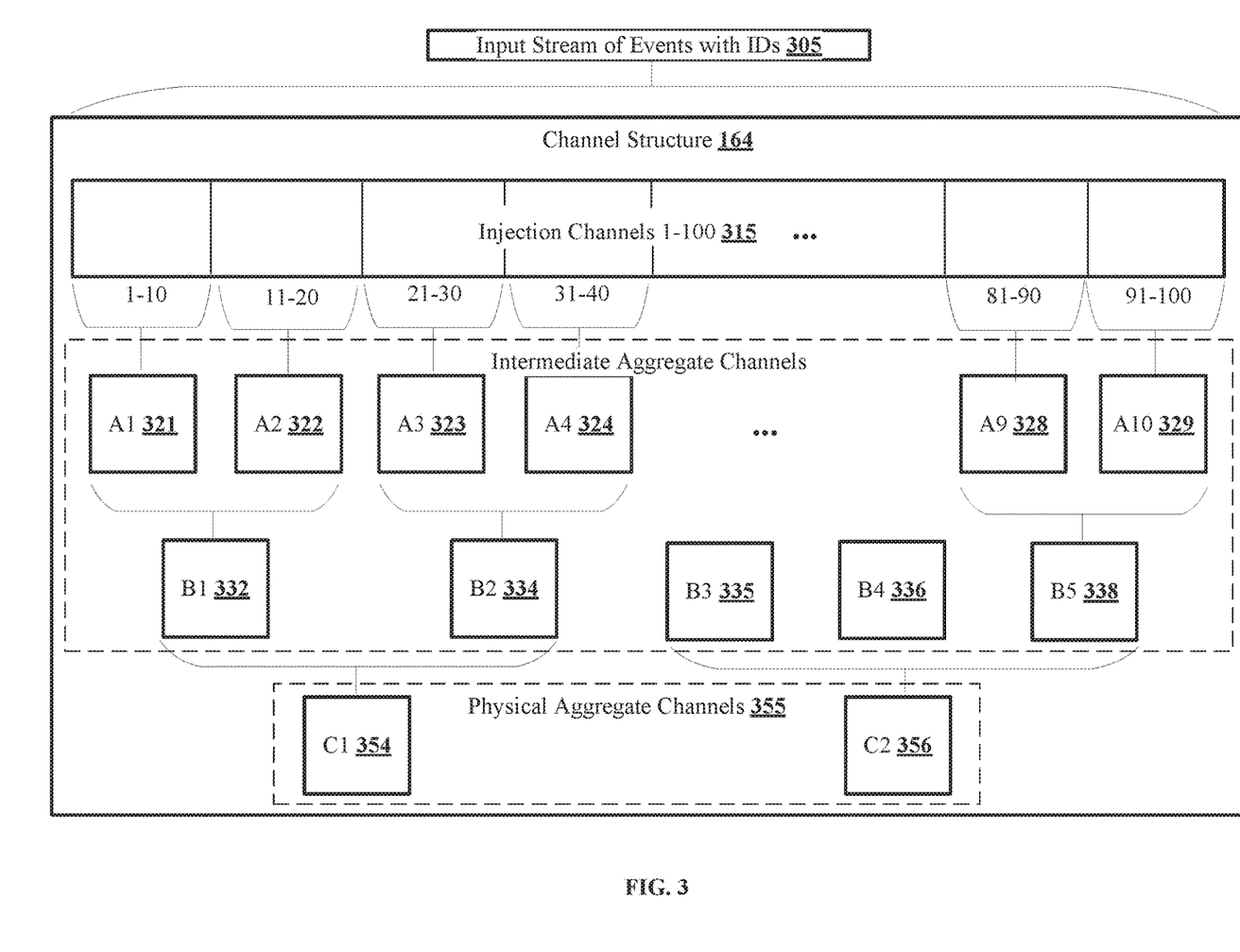
FIG. 3 shows an example channel structure for accelerating replay access to numerous streams via a channel aggregation hierarchy, according to one implementation of the technology disclosed.

Architecture 100 also includes subscribers 166 who are clients who request data replay for their channels, subscription manager 128 for processing subscriber replay requests, and channel structure 164 which includes hundreds to thousands—or more, injection channels, also referred to as input buffers, for handling events. FIG. 3 shows the block diagram for channel structure 164, described infra. Cache builder 138 maintains a cache buffer that corresponds to the topology of the multiplexing network as well as the current subscribers. Also included in architecture 100 is cache 158 which includes JAVA event data and JAVA pointers in one implementation. Cache builder 138 caches references to selected events, which belong to active channels that have subscribers, in a caching structure of numerous channel cache lists, the caching structure representing the channel aggregation hierarchy, including stream level channel cache lists, intermediate level channel cache lists, and, if the physical aggregated channel has subscribers, a physical aggregated channel cache list.

Continuing the description of FIG. 1, architecture 100 includes subscribers 166 and persistent data store 156—a rich contextual data store that includes various physical aggregated channel storage nodes C1 and C2. In other implementations, additional physical storage nodes can be included.

Further continuing the description of FIG. 1, network 145 interconnects the elements of architecture 100, coupling stream manager 125, IoT devices 122, application data source(s) 152, subscription manager 128, cache builder 138, cache 158, subscribers 166, subscription manager 128, channel structure 164 and persistent data store 156 in communication with each other. The actual communication path can be point-to-point over public and/or private networks. Some items, such as data from data sources, might be delivered indirectly, e.g. via an application store (not shown). The communications can occur over a variety of networks, e.g. private networks, VPN, MPLS circuit, or Internet, and can use appropriate APIs and data interchange formats, e.g. REST, JSON, XML, SOAP and/or JMS. The communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, OAuth, Kerberos, Secure ID, digital certificates and more, can be used to secure the communications.

FIG. 1 shows an architectural level schematic of a system in accordance with an implementation. Because FIG. 1 is an architectural diagram, certain details are intentionally omitted to improve the clarity of the description.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. In addition, the technology disclosed can be implemented using different programming models like MapReduce™, bulk synchronous programming, MPI primitives, etc. or different stream management systems like Apache Storm™, Apache Spark™, Apace Kafka™, Treviso™, IBM Info-Sphere™, Borealis™ and Yahoo! S4™.

In an implementation, architecture 100 can be located in a cloud computing environment, and may be implemented as a multi-tenant database system. As used herein, the term multi-tenant database system refers to those systems in which various elements of hardware and software of the database system may be shared by one or more tenants. For example, a given application server may simultaneously process requests for a great number of tenants, and a given database table may store rows for multiple tenants.

In some implementations, the elements or components of architecture 100 can be engines of varying types including workstations, servers, computing clusters, blade servers, server farms, or any other data processing systems or computing devices. The elements or components can be communicably coupled to the databases via a different network connection.

In some implementations, databases used in architecture 100 can store information from one or more tenants into tables of a common database image to form a multi-tenant database system. A database image can include one or more database objects. In other implementations, the databases can be relational database management systems (RDBMS), object oriented database management systems (OODBMS), distributed file systems (DFS), no-schema database management systems, or any other data storing systems or computing devices.

While architecture 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Figure 2:
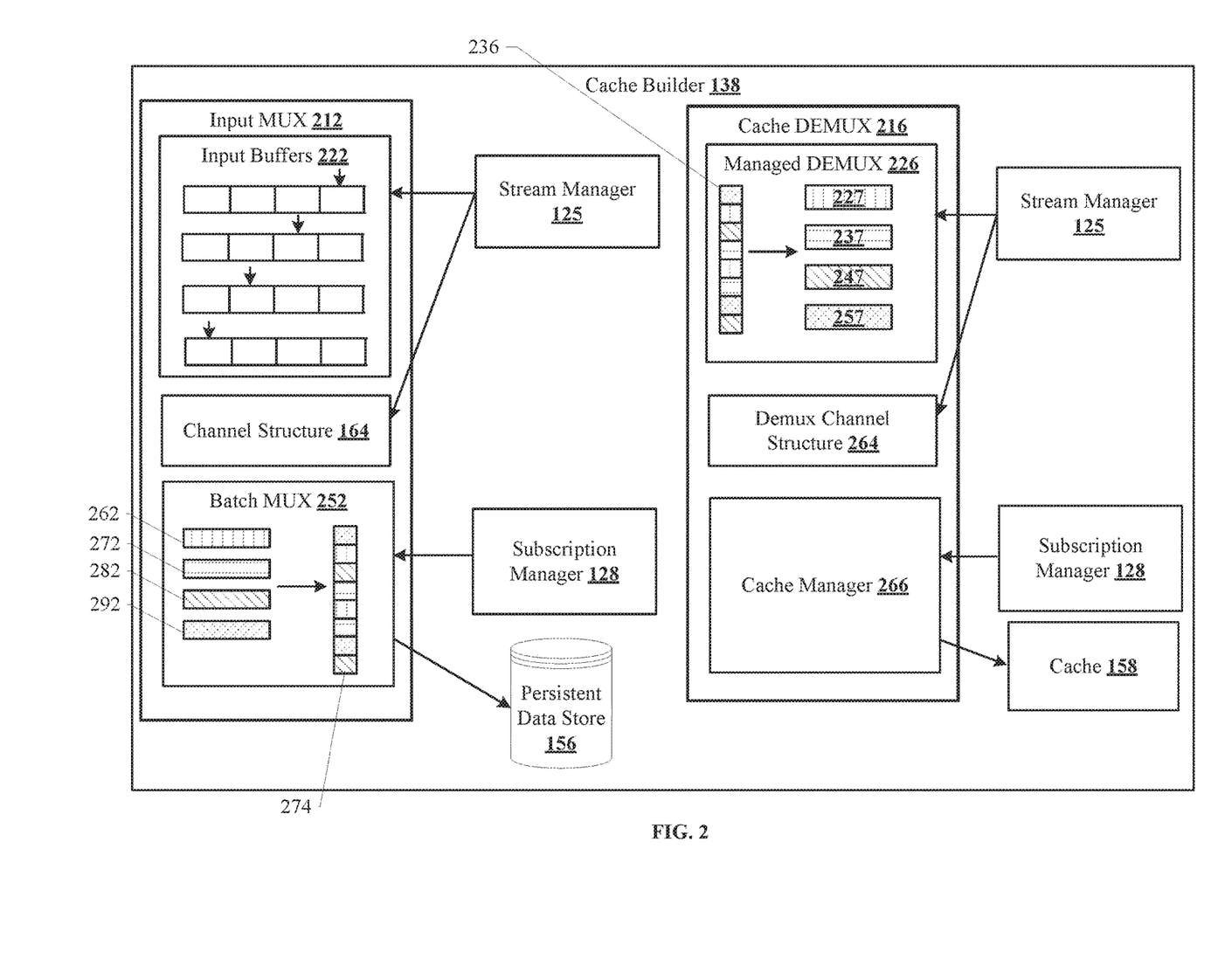
FIG. 2 illustrates a block diagram for a cache builder for the system depicted in FIG. 1, according to one implementation of the technology disclosed.

FIG. 2 shows an example block diagram for cache builder 138—utilized in architecture 100 in FIG. 1. Cache builder 138 includes multiplexor input MUX 212 with input buffers 222 which can buffer one hundred or more events from numerous streams into a physically aggregated stream in memory. Stream manager 125 processes the streams of events through channel structure 164, which is described in more detail relative to FIG. 3 infra. Subscription manager 128 provides data to batch multiplexor 252, to specify whether event data channels have active subscriptions, and batch multiplexor 252 collects and queues incoming events for delivery to persistent data store 156. Batch multiplexor 252 optionally drops events that have no current or recent subscribers. Batch multiplexor 252 serializes the incoming events, translating the data structures into a format that can be stored and reconstructed later. When the resulting series of bits is reread according to the serialization format, it can be used to create a semantically identical clone of the original object. In the example in FIG. 2, client A data 262 is shown with a vertical pattern, client B data 272 is distinguished by horizontal lines, client C data 282 by horizontal lines, and client D data 292 by a dotted pattern; and the result is serialized multiplexed data 274 for clients A through D.

Continuing the description of FIG. 2, stream manager 125 directs near real-time (NRT) multiplexing of events as they occur—in one implementation, up to one million events per second per injection channel. Data from batch multiplexor 252 can be transmitted concurrently to a SQL data store and NoSQL data store. Stream manager 125 can be implemented using one or more stream processors like Apache Storm™ and Apache Samza™ or a batch-stream processor such as Apache Spark™.

Continuing with FIG. 2, cache demux 216 is a demultiplexer that includes managed demux 226, which demultiplexes serialized multiplexed data 236 via deserialization into client A data 227, client B data 237, client C data 247 and client D data 257. Stream manager 125 directs the demultiplexed data through demux channel structure 264 which mirrors channel structure 164 and can include hundreds to thousands—or more, channels for handling events. Subscription manager 128 directs replay requests to cache manager 266, which updates the cache 158 with the active subscriber data.

FIG. 3 shows the block diagram for channel structure 164 for the multiplexing network. An input stream of events with IDs 305 enters the channel structure through injection channels 315. FIG. 3 illustrates an example with one hundred injection channels 315, also referred to as topics. In another use case, thousands of injection channels could be included in an implementation to service the clients of a system.

Continuing with FIG. 3, the hierarchy of the channel structure is configurable in architecture 100, to balance the asymmetry in data injection rates among clients, because some clients are chattier, receiving as many as a million times the number of incoming events as other clients. In many use cases, the majority of clients have a small number of injected events per unit of time. FIG. 3 shows an example configuration with injection channels one through ten multiplexed into intermediate aggregate channel A1 321, injection channels eleven through twenty multiplexed into intermediate aggregate channel A2 322, injection channels twenty-one through thirty multiplexed into intermediate aggregate channel A3 323, injection channels thirty-one through forty multiplexed into intermediate aggregate channel A1 321 and similarly through to injection channels eighty-one through ninety multiplexed into intermediate aggregate channel A9 328 and injection channels ninety-one through one hundred multiplexed into intermediate aggregate channel A10 329. Intermediate aggregate channels A1 321 and A2 322 are multiplexed into intermediate aggregate channel B1 332 and intermediate aggregate channels A3 323 and A4 324 are multiplexed into intermediate aggregate channel B2 334 and similarly through intermediate aggregate channels A9 328 and A10 329 multiplexed into B5 338. Intermediate aggregate channels B1 332 and B2 334 are multiplexed into physical aggregate channel C1 354 and similarly, intermediate aggregate channels B3 335, B4 336 and B5 338 are multiplexed into physical aggregate channel C2 356. That is, in this example, all one hundred channels are multiplexed in physical aggregate channels C1 354 and C2 356, via the three layer web of channels illustrated in FIG. 3.

Physical aggregate channels persist events multiplexed from unique channels with active subscribers and for channels with no active subscribers, in persistent data store 156 that includes storage nodes C1 and C2. In another use case, a different number of storage nodes can be implemented. Injection channels and intermediate aggregate channels are logical channels and the terminal aggregate channels are physical channels in the web of channels, in one implementation of the disclosed technology.

Events arrive with an uneven distribution of data frequency, are injected in monotonically increasing order, via the one hundred injection channels. The data flows through the web of channels and is stored, eventually, in physical aggregate channels 355, in either C1 354 or C2 356. Subscribers 166 to the data channels, also referred to as consumers, are allowed to subscribe to any of the web of channels and receive the data events for that channel. A consumer subscribed to channel A1 321 receives all data/events in order coming in from channels one through ten. If subscribed to channel B2 334, the subscriber receives all events, in order, coming in from channels thirty-one through forty. If subscribed to channel C2 356, the consumer receives all events, in order, coming in from channels forty-one through one hundred. Each piece of data contains a unique numerical ID which is monotonically increasing based on the order in which the events are inserted into the system: for example ID 1000, ID 1001, ID 1002, etc.

To understand the two major difficulties of high-throughput clients dominating the traffic, resulting in unacceptably poor performance for low-throughput clients; and compounding the de-multiplexing cost per client that previously prevented the system from being scalable with respect to the number of clients, imagine a system has one hundred injectors publishing data into the one hundred channels, with data published in channel one at a rate of one million events per minute, while all the remaining ninety-nine channels have one event per minute injection rate. This is commonly the case for production systems. In this scenario, multiplexed channels A1, B1 and C1 will be filled with data almost entirely from channel one. When clients subscribe to channel 2-40, with the traditional solution, the system would need to fetch all the data from C1, and then de-multiplex the data before recognizing that 99.99% of the data is from channel one, thus discarding that data, to deliver the tiny portion of data to the clients subscribing to channels two through forty. The cost of such inefficiency is often prohibitively high for the system to function properly, and the majority of low-throughput clients would have unacceptable performance, which in turn would overwhelm the system and cause it to become even more unusable. The second problem with the traditional solution is that, while replaying, the system would need to de-multiplex all the same one million events for each client to find out which data subset can be delivered to which client. The de-multiplexing cost is compounded per client, hence, preventing the system from scaling with respect to the number of clients. For example, assume currently there are 100,000 events in the system, injected from channel 1 to 100: channel 1 injected [1, 1000], channel 2 injected [1001, 2000], channel 100 injected [99001, 100000], etc. In practice, all these events are typically interleaved. For this example, imagine that four clients subscribe to channel 1, 25, A1 and B2 and request replay from 0, 10, 20 and 30 respectively. In this example, clients on channel 1 require fetching data [1, 1000], clients on channel 25 require fetching data [25001, 26000], clients on channel A1 require fetching data [21, 10000], and clients on channel B2 require fetching data [31001, 40000]. Note that all events [1, 40000] are multiplexed and stored in the physical channel C1, with the traditional approach, so the system would need to fetch all events [1, 40000] for client 1, de-multiplex them to realize client only needs [1, 1000]. The system would need to fetch all [21, 40000] for client on channel 25 and de-multiplex it to deliver only [25001, 26000], and so on. Note the amount of data that the system can fetch each time is bounded by a batch size. That is, no system is designed to scoop up gigabytes of data at a time from back end storage. Hence, for clients on A1, the system needs multiple network fetches, and demultiplexing before reaching 25001, after which it needs another round of fetches to reach all the way to 40000, the latest event, even though all the needed data is up to 26000, which only becomes clear after de-multiplexing through all 400000 events. Additionally, the system needs to track the intermediate replay for each client in this process. Furthermore, during the same time interval, new events are continuously injected across all one hundred channels, while the system continues to deliver data to all subscribing clients on various layers of the multiplexed network from various different replay event IDs.

The disclosed technology makes the scaling of the system with respect to the number of clients possible—through the creation and maintenance of a cache system corresponding to the topology of the multiplexing network as well as the current sub scribers.

Figure 4:
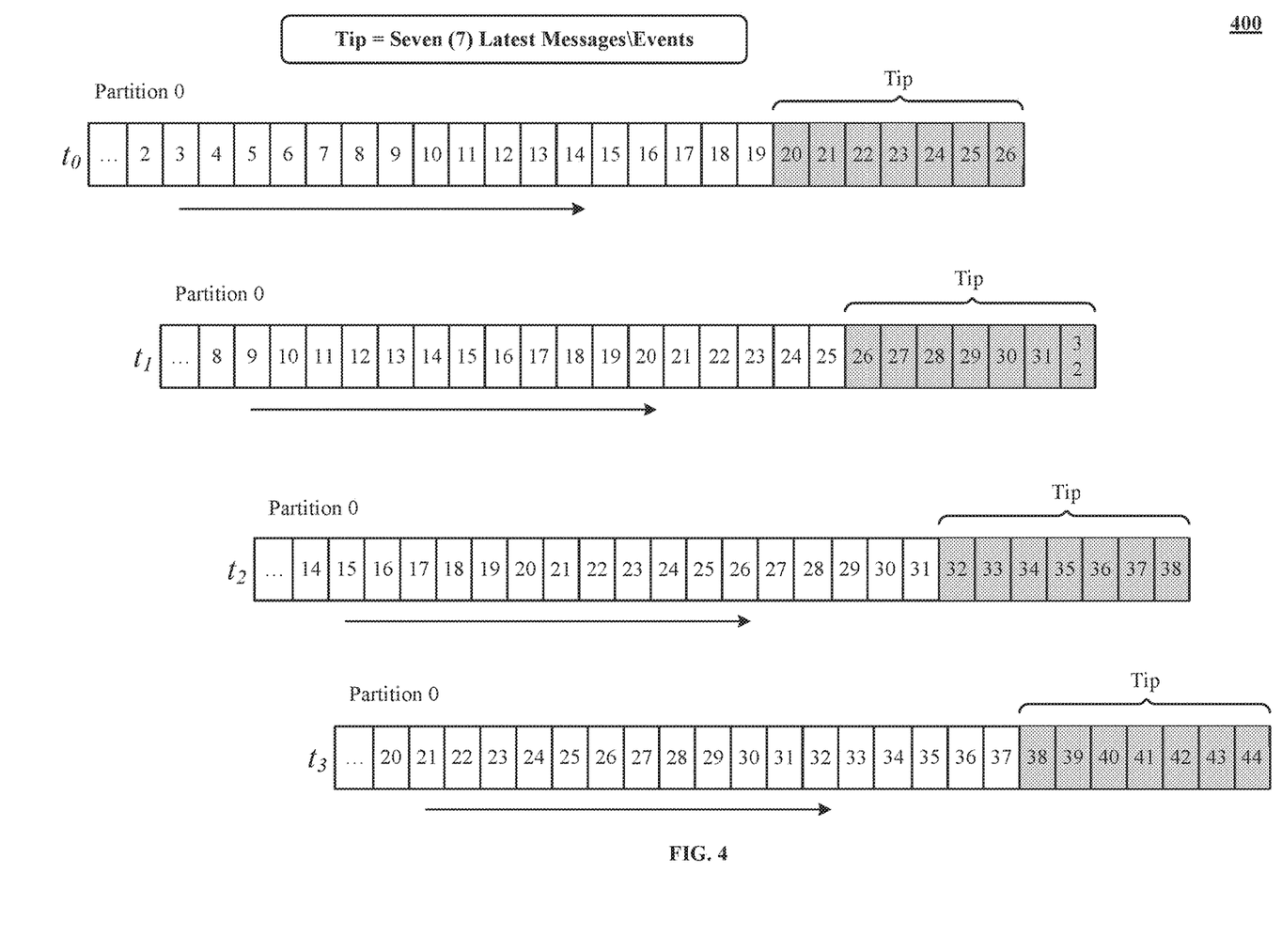
FIG. 4 illustrates an unbounded data stream with a dynamic tip.

FIG. 4 illustrates an unbounded data stream 400 with a dynamic tip. In particular, FIG. 4 shows a Kafka partition 0 that includes an unbounded sequence of messages or events, with new messages or events being appended as time progresses. FIG. 4 also shows that partition 0 has a dynamic tip which includes the most recent or latest messages or events appended to partition 0. In FIG. 4, the dynamic tip at a current time is depicted with a grey color code. In one implementation, a number of most recent messages or events that constitute a current tip are configurable. For instance, in one implementation, the dynamic tip includes the seven latest messages received by partition 0. As depicted in FIG. 4, the dynamic tip of partition 0 includes messages from offsets 20 to 26 at $t_0$. At $t_1$, the dynamic tip is updated to include messages from offsets 26 to 32. At $t_2$, the dynamic tip is updated to include messages from offsets 32 to 38. At $t_3$, the dynamic tip is updated to include messages from offsets 38 to 44. Thus, the tip of unbounded data stream 400 always includes the most recently received messages or events. The size of the cache buffer can be configured by byte size and event number. In one implementation, the tip can be configured to include a single most recent event of a channel, by configuring the cache to contain at most one event.

The subscribers are not only allowed to subscribe to the "tip" to receive new events that are injected after their subscriptions, but more importantly, they could subscribe to a particular event ID from the past. For example, assuming the current newest event is at 100,000, the consumer could subscribe to channel 1 at 99,950 or 99,000 or even from the beginning—the system would need to deliver all the events starting from 99,951 or 99,001 or 1 respectively. As discussed supra, the ability to replay is the key feature allowing the client to have a durable data stream. For example, in the case of disconnect, the client can subscribe to the previously dropped-off event ID to continue to receive all the data without any loss.

In some implementations, some channels can be configured as transient, so they utilize very small pointer buffers, also referred to as cache lists. In this configuration, the channels can be identified at creation as transient. In other implementations, data for replay can be persisted for as long as three days to cover a weekend, but the typical restart after loss of signal requests replay for only a few seconds or minutes before the stream tip.

Figure 5:
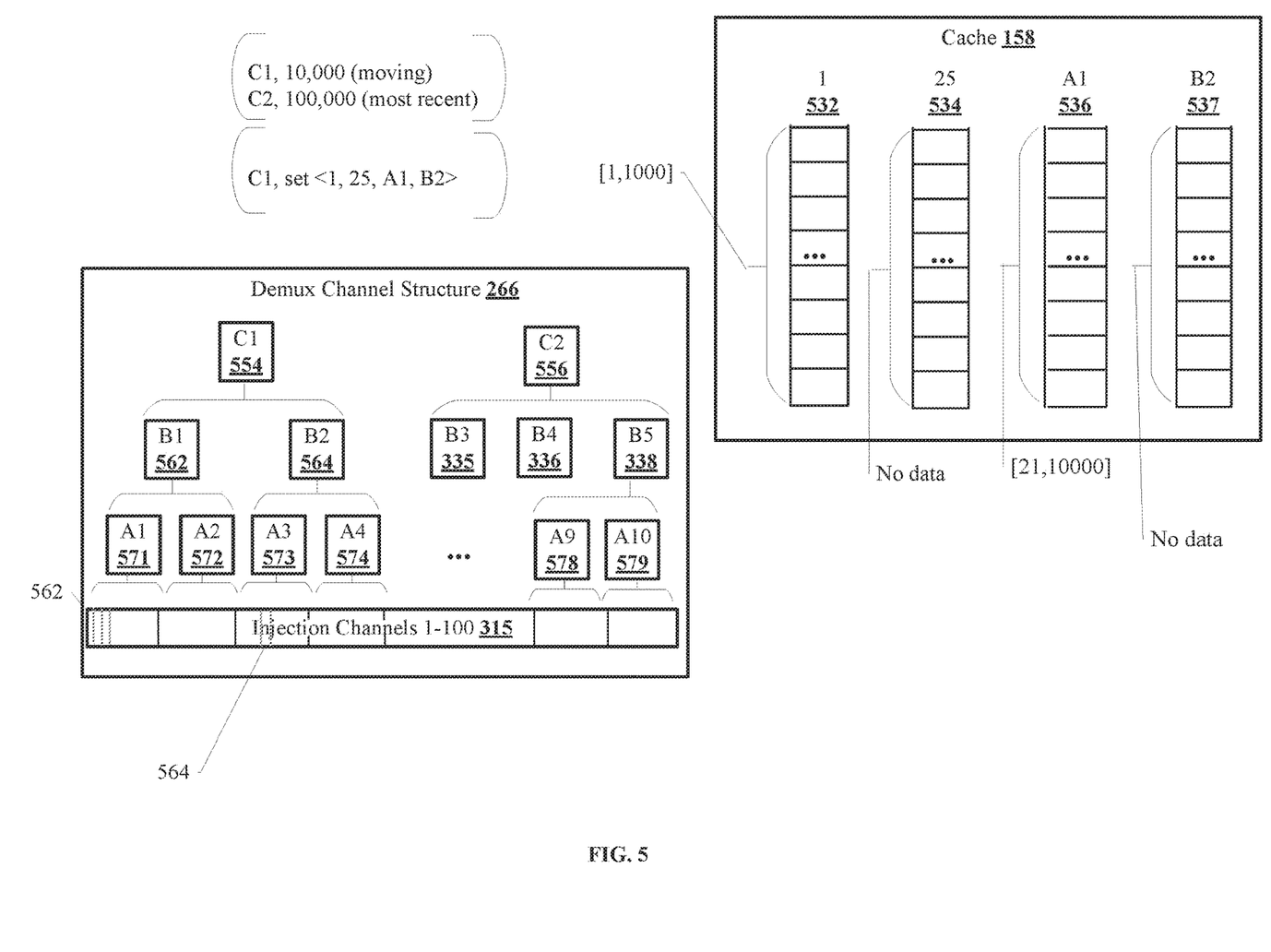
FIG. 5 shows an example cache structure, in correspondence to the routing network and to four active subscribing clients.

FIG. 5 shows an example cache structure, in correspondence to the routing network and to four active subscribing clients. The caches are maintained by harvesting recent events periodically across all the physical channels. The harvesting process fetches and de-multiplexes the event data once, for all of the active subscriber channels. Separate caches are established for the current tips of data streams and replays are served from the caches instead of from the backend data store, with the caches updated periodically to include the most recent events appended to the dynamic tips of the data streams, as described in "Cache Based Efficient Access Scheduling for Super Scaled Stream Processing Systems", which is incorporated by reference in this application. Cache-miss handling is also described in this application.

The disclosed system and method deliver an innovative solution, making the scaling of the system with respect to the number of clients possible by creating and maintaining a cache system corresponding to the topology of the multiplexing network as well as the current subscribers. For example, if clients are currently subscribed to channel 1 562, 25 564, A1 571, B2 564, then the cache system maintains a cache buffer for each of these four channels, and each cache buffer contains the most recent batch of events for this channel, with the batch size configurable; as an example, 2000. The system maintains the cache by periodically harvesting all the new events for the cache from the storage. In one case, periodically can be every 200 ms. In another use case, periodic harvesting operations can occur every 10 ms. In this example, subscribers 1 562, 25 564, A1 571, B2 564 are on the multiplexed C1 channel, so the system need only harvest new events from C1 incrementally.

In the example described supra, and assuming the system is idle before the four clients subscribed, upon the subscription, the system would first calculate the routing chains for all the subscribing clients and recognize that they are multiplexed down to C1 and the earliest event needed is "one". Then, the system fetches events in large chunks starting from one and going up, and de-multiplexes them along the way to update the four cache buffers respectively. In the example, the system would first fetch 10,000 events from C1 554, and de-multiplex them to B1 562 and/or B2 564, then further de-multiplex them to A1 571, A2 572 and A10 579 before finally to channel 1 to 100. Along this path of de-multiplexing, the system can put the corresponding events in the four buffers corresponding to the four current subscribers. As a result, buffer one would get events [1, 1000], buffer twenty-five gets no data, buffer A1 gets [21, 10000] and buffer B2 would get nothing. Once the buffer contains data deliverable to a subscribing client, they will deliver the data. And the system will start a next round of harvesting, scooping data from C1; that is fetching [10001, 20000] and so on, similarly.

An example event for topic "/event/Order_Event_e" is the surface topic at the top of the routing network. Later in time, this topic would get multiplexed down in the following fashion, with "00D0X000000123" as the organization ID. The same org could have multiple topics. Multiplexing in this way allows a user to subscribe to "00D0X000000123" to get events from ALL topics belonging to this org. "NA11" is the POD/INSTANCE/CLUSTER ID. Multiplexing this way allows internal system jobs to subscribe/retrieve all events from the same POD/INSTANCE/CLUSTER. Finally, "kafka.mux" is the final physical topic set up in the story system; that is, Kafka in this example.

"/event/Order_Event_e"-->"00D0X000000123"---> "NA11"--->"kafka.mux",

The event ID is a number, providing monotonicity in the order according to when events were injected into the system.

```
{
    "topic":"/event/Order_Event___e",
    "replayId":1,
    "data":{
        "schema":"7cBPcbWRGAqoVPAYeCcC2w"
        "payload":{
            "CreatedDate":"2017-04-14T13:35:23Z",
            "CreatedById":"005B00000031mqb",
            "Customer_Last_Name___c":"Wilson",
            "Customer_First_Name___c":"Tom",
            "Source__c":[
                "Web",
                "Friends",
                "News Letter"
            ],
            "Model_Number___c":"M100",
            "Order_Number___c":"10013",
            "Type___c":"Placed"
        }
    }
}
```

For some implementations of the disclosed technology, also configurable is an option of identifying how much history to maintain; in one example storing events for twenty minutes.

Cache manager 266 sorts events by their topics, also referred to as channels, including the surface topic and underlying topics, when and only when there are subscribers on the channels. That is, if there are hundreds of clients subscribed to both "/event/Order_Event_e" and "00D0X000000123", there would be an exactly two topic buffer cache for these two topics, each of which is shared, to serve all the subscriptions on that topic.

For each topic buffer in the cache 158, events in the buffer are maintained in a sophisticated way. Conceptually, the event window is moving forward with the most recent events. At time one, the buffer may contain events from 100 to 200; then at time two, events may be from [150, 250], and similarly, moving forward in time. While this forward-moving event window is updated, it serves all the subscriptions on the same topic.

Clients that subscribe with not-too-ancient replay IDs to channels with existing caches, get data delivered to them immediately with no need to go to the bottom of the multiplex chain.

In the case of a cache miss, replay access requests can be batched for block de-multiplexing of events at the physical aggregate channel. That is, for the set of cache-miss clients, an efficient fetching strategy is devised to fetch data in large chunks from the end multiplexed channel, such that the data is fetched and de-multiplexed only once for all of the affected clients. Cache miss clients generally quickly catch up, and they can then be served out of cache again. That is, the disclosed technology includes batching cache miss-causing replay access requests that request events from a same physical aggregate channel, for cache miss-causing replay access requests for events not already present in the cache; and demuxing events in the physical aggregate channel, producing demuxed events, and caching the demuxed events into event cache memory responsive to the batch of cache miss-causing replay access requests.

Multi-Tenant Integration

Figure 6:
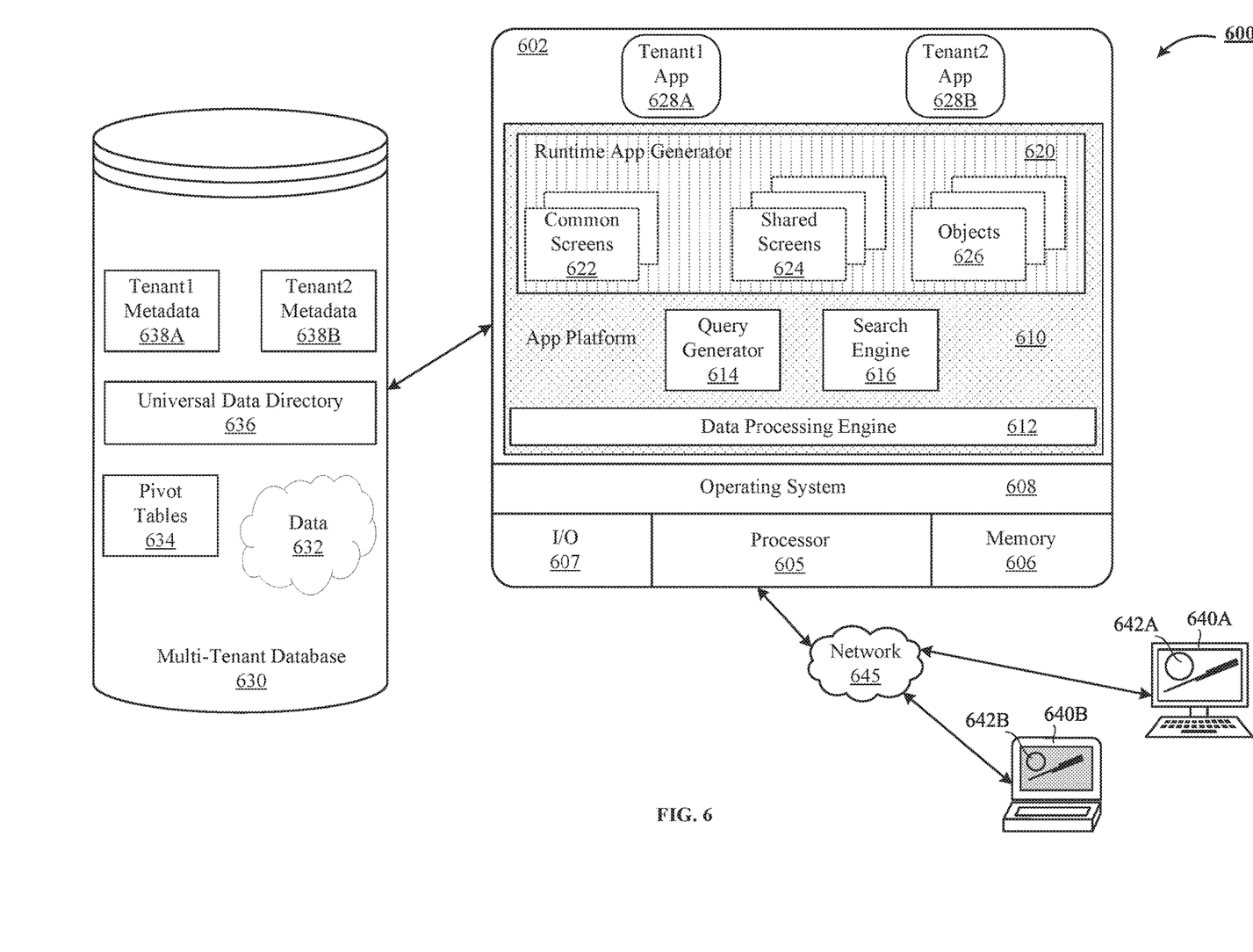
FIG. 6 is a block diagram of an exemplary multi-tenant system suitable for accelerating replay access to numerous streams via a channel aggregation hierarchy, in accordance with one or more implementations of the technology disclosed.

FIG. 6 is a block diagram of an exemplary multi-tenant system 600 suitable for accelerating replay access to numerous streams via a channel aggregation hierarchy, in accordance with one or more implementations.

Architecture 100 of FIG. 1 can be implemented using a multi-tenant system. In that regard, FIG. 10 presents a conceptual block diagram of an exemplary multi-tenant system suitable for integration with the architecture 100 of FIG. 1 in accordance with one or more implementations.

In general, the illustrated multi-tenant system 600 of FIG. 6 includes a server 602 that dynamically creates and supports virtual applications 628 based upon data 632 from a common database 630 that is shared between multiple tenants, alternatively referred to herein as a "multi-tenant database". Data and services generated by the virtual applications 628A and 628B are provided via a network 645 to any number of client devices 640A or 640B, as desired. Virtual applications 628A and 628B are suitably generated at run-time (or on-demand) using application platform 610 that securely provides access to the data 632 in the database 630 for each of the various tenants subscribing to the multi-tenant system 600. In accordance with one non-limiting example, the multi-tenant system 600 is implemented in the form of an on-demand multi-tenant user relationship management (CRM) system that can support any number of authenticated users of multiple tenants.

As used herein, a "tenant" or an "organization" refers to a group of one or more users that shares access to common subset of the data within the multi-tenant database 630. In this regard, each tenant includes one or more users associated with, assigned to, or otherwise belonging to that respective tenant. Stated another way, each respective user within the multi-tenant system 600 is associated with, assigned to, or otherwise belongs to a particular tenant of the plurality of tenants supported by the multi-tenant system 600. Tenants may represent users, user departments, work or legal organizations, and/or any other entities that maintain data for particular sets of users within the multi-tenant system 600. Although multiple tenants may share access to the server 602 and the database 630, the particular data and services provided from the server 602 to each tenant can be securely isolated from those provided to other tenants. The multi-tenant architecture therefore allows different sets of users to share functionality and hardware resources without necessarily sharing any of the data 632 belonging to or otherwise associated with other tenants.

The multi-tenant database 630 is any sort of repository or other data storage system capable of storing and managing the data 632 associated with any number of tenants. The database 630 may be implemented using any type of conventional database server hardware. In various implementations, the database 630 shares processing hardware with the server 602. In other implementations, the database 630 is implemented using separate physical and/or virtual database server hardware that communicates with the server 602 to perform the various functions described herein. In an exemplary implementation, the database 630 includes a database management system or other equivalent software capable of determining an optimal replay access request plan for retrieving and providing a particular subset of the data 632 to an instance of virtual application 628A or 628B in response to a replay access request initiated or otherwise provided by a virtual application 628A or 628B. The multi-tenant database 630 may alternatively be referred to herein as an on-demand database, in that the multi-tenant database 630 provides (or is available to provide) data at run-time to on-demand virtual applications 628A or 628B generated by the application platform 610.

In practice, the data 632 may be organized and formatted in any manner to support the application platform 610. In various implementations, the data 632 is suitably organized into a relatively small number of large data tables to maintain a semi-amorphous "heap"-type format. The data 632 can then be organized as needed for a particular virtual application 628A or 628B. In various implementations, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, work logic and other constructs that are common to multiple tenants. Tenant-specific formatting, functions and other constructs may be maintained as tenant-specific metadata for each tenant, as desired. Rather than forcing the data 632 into an inflexible global structure that is common to all tenants and applications, the database 630 is organized to be relatively amorphous, with the pivot tables 634 and the metadata 638A and 638B providing additional structure on an as-needed basis. To that end, the application platform 610 suitably uses the pivot tables 634 and/or the metadata 638A-B to generate "virtual" components of the virtual applications 628A and 628B to logically obtain, process, and present the relatively amorphous data 632 from the database 630.

The server 602 is implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware such as a processor 605, memory 606, input/output features 607 and the like. The input/output features 607 generally represent the interface(s) to networks (e.g., to the network 645, or any other local area, wide area or other network), mass storage, display devices, data entry devices and/or the like. The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short or long term storage or other computer-readable media capable of storing programming instructions for execution on the processor 605, including any sort of random access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628A and 628B, and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or application platform, e.g., a portable hard drive, a USB flash drive, an optical disc, or the like.

The application platform 610 is any sort of software application or other data processing engine that generates the virtual applications 628A and 628B that provide data and/or services to the client devices 640A and 640B. In a typical implementation, the application platform 610 gains access to processing resources, communications interfaces and other features of the processing hardware using any sort of conventional or proprietary operating system 608. The virtual applications 628A and 628B are typically generated at run-time in response to input received from the client devices 640A and 640B. For the illustrated implementation, the application platform 610 includes a bulk data processing engine 612, a query generator 614, a search engine 616 that provides text indexing and other search functionality, and a runtime application generator 620. Each of these features may be implemented as a separate process or other module, and many equivalent implementations could include different and/or additional features, components or other modules as desired.

The runtime application generator 620 dynamically builds and executes the virtual applications 628A and 628B in response to specific requests received from the client devices 640A and 640B. The virtual applications 628A and 628B are typically constructed in accordance with the tenant-specific metadata 638A and 638B, which describes the particular tables, reports, interfaces and/or other features of the particular application 628A or 628B. In various implementations, each virtual application 628A or 628B generates dynamic web content that can be served to a browser or other client programs 642A and 642B associated with its client device 640A or 640B, as appropriate.

The runtime application generator 620 suitably interacts with the query generator 614 to efficiently obtain multi-tenant data 632 from the database 630 as needed in response to input queries initiated or otherwise provided by users of the client devices 640A and 640B. In a typical implementation, the query generator 614 considers the identity of the user requesting a particular function (along with the user's associated tenant), and then builds and executes queries to the database 630 using system-wide metadata within a universal data directory (UDD) 636, tenant specific metadata 638A and 638B, pivot tables 634, and/or any other available resources. The query generator 614 in this example therefore maintains security of the common database 630 by ensuring that queries are consistent with access privileges granted to the user and/or tenant that initiated the request. In this manner, the query generator 614 suitably obtains requested subsets of data 632 accessible to a user and/or tenant from the database 630 as needed to populate the tables, reports or other features of the particular virtual application 628A or 628B for that user and/or tenant.

Still referring to FIG. 6, the data processing engine 612 performs bulk processing operations on the data 632 such as uploads or downloads, updates, online transaction processing, and/or the like. In many implementations, less urgent bulk processing of the data 632 can be scheduled to occur as processing resources become available, thereby giving priority to more urgent data processing by the query generator 614, the search engine 616, the virtual applications 628A and 628B, etc.

In exemplary implementations, the application platform 610 is utilized to create and/or generate data-driven virtual applications 628A and 628B for the tenants that they support. Such virtual applications 628A and 628B may make use of interface features such as custom (or tenant-specific) screens 624, standard (or universal) screens 622 or the like. Any number of custom and/or standard objects 626 may also be available for integration into tenant-developed virtual applications 628A and 628B. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 632 associated with each virtual application 628A or 628B is provided to the database 630, as appropriate, and stored until it is requested or is otherwise needed, along with the metadata 638A and 638B that describes the particular features (e.g., reports, tables, functions, objects, fields, formulas, code, etc.) of that particular virtual application 628A or 628B. For example, a virtual application 628A or 628B may include a number of objects 626 accessible to a tenant, wherein for each object 626 accessible to the tenant, information pertaining to its object type along with values for various fields associated with that respective object type are maintained as metadata 638A and 638B in the database 630. In this regard, the object type defines the structure (e.g., the formatting, functions and other constructs) of each respective object 626 and the various fields associated therewith.

With continued reference to FIG. 6, the data and services provided by the server 602 can be retrieved using any sort of personal computer, mobile telephone, tablet or other network-enabled client device 640A or 640B on the network 645. In an exemplary implementation, the client device 640A or 640B includes a display device, such as a monitor, screen, or another conventional electronic display capable of graphically presenting data and/or information retrieved from the multi-tenant database 630. Typically, the user operates a conventional browser application or other client program 642A or 642B executed by the client devices 640A and 640B to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628A or 628B, the runtime application generator 620 suitably creates the application at run time based upon the metadata 638A and 638B, as appropriate. As noted above, the virtual application 628A or 628B may contain Java, ActiveX, or other content that can be presented using conventional client software running on the client device 640A or 640B; other implementations may simply provide dynamic web or other content that can be presented and viewed by the user, as desired.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

For the sake of brevity, conventional techniques related to databases, social networks, user interfaces, and other functional aspects of the systems (and the individual operating components of the systems) may not be described in detail herein. In addition, those skilled in the art will appreciate that implementations may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Implementations of the subject matter may be described herein in terms of functional and/or logical block components, with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary implementations, the subject matter described herein is implemented in conjunction with a virtual user relationship management (CRM) application in a multi-tenant environment.

Some Particular Implementations

Some particular implementations and features are described in the following discussion.

In one implementation, a disclosed method of reducing computational complexity and latency when responding to queries for events multiplexed through a hierarchy of injection channels, intermediate aggregate channels, and physical aggregate channels, the method includes multiplexing events through a hierarchy of injection channels, intermediate aggregate channels, and physical aggregate channels, wherein events in the physical aggregate channels are persisted in storage. The method also includes receiving a multitude of queries for events, wherein each query requests events multiplexed from at least one channel in the hierarchy; establishing separate pointer structures for subscribed to channels, wherein the pointer structures reference, for the respective subscribed to channels, demultiplexed events harvested to a cache from one or more active physical aggregate channels, wherein an active physical aggregate channel is a physical aggregate channel that has events multiplexed from at least one requested, unique channel; and block demultiplexing events in the active physical aggregate channels. Based on the block demultiplexing, the disclosed method further includes identifying events multiplexed from the respective subscribed to channels and not previously harvested to the cache; harvesting the identified demultiplexed events from the active physical aggregate channels to the cache and updating the pointer structures to reference, for the respective requested, unique channels, the harvested demultiplexed events; and responding to the queries using the pointer structures and the demultiplexed events in the cache, without requiring separate demultiplexing and harvesting for each of the queries.

In another implementation, a disclosed method of accelerating replay access to numerous streams via a channel aggregation hierarchy, includes muxing events from at least 100 input buffers that receive event streams, into a physically aggregated stream in memory, wherein a subscriber is permitted to access events from the streams via a stream level channel, a physical aggregate level channel or an intermediate level channel that aggregates stream level channels and contributes to the physical aggregate level channel. The method also includes demuxing the physical aggregated stream and caching the events from the physical aggregated stream into event cache memory; caching references to selected events, which belong to active channels that have subscribers, in a caching structure including channel cache lists of the references, the caching structure representing the channel aggregation hierarchy, including stream level channel cache lists, intermediate level channel cache lists, and, if the physical aggregate channel has subscribers, a physical aggregated channel cache list; and receiving a replay access request that specifies a channel at one of the stream level, intermediate level or physical aggregate channel and that specifies a starting point for the replay, and responsively delivering events from the event cache memory using a cache list corresponding to the specified channel. In yet another implementation, the disclosed includes muxing events from at least 50 input buffers that receive event streams.

This method and other implementations of the technology disclosed can include one or more of the following features and/or features described in connection with additional methods disclosed. In the interest of conciseness, the combinations of features disclosed in this application are not individually enumerated and are not repeated with each base set of features.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation of the disclosed method, the active physical aggregate channels have events multiplexed from subscribed to channels and channels without subscribers. In some implementations of the disclosed method, the subscribed to channels include the injection channels, the intermediate aggregate channels, and the physical aggregate channels.

In one implementation, the method further includes repeating the block demultiplexing and the harvesting at ten to two hundred millisecond intervals. For some implementations, eighty five to ninety five percent replay queries request events already present in the cache, further including responding to the replay queries using the established pointer structures and pre-demultiplexed events in the cache, without requiring separate demultiplexing and harvesting of the requested events.

In yet other implementation of the disclosed method, a first query requests events multiplexed from a first channel and already present in the cache, further including identifying a first pointer structure established for the first channel; retrieving, from the cache, pre-demultiplexed events referenced by the first pointer structure and responsive to the first query; and responding to the first query with the retrieved pre-demultiplexed events, without requiring real-time demultiplexing and harvesting of requested events or requiring real-time redundant demultiplexing of events multiplexed from non-requested channels that share an active physical aggregate channel with the first channel. In one case, the first channel is a low-throughput channel with a streaming rate of one to ten events per minute and one other channel is a high-throughput channel with a streaming rate of one to ten million events per minute. The disclosed method can further include batching cache miss-causing replay queries that request events from a same physical aggregate channel, wherein a cache miss-causing replay query is a replay query that requests events not already present in the cache; block demultiplexing events in the physical aggregate channel to produce old demultiplexed events; and responding to the cache miss-causing replay queries by harvesting from the old demultiplexed events, the events responsive to the cache miss-causing replay queries, until the old demultiplexed events catch up with events already present in the cache, then continuing to respond using the pointer structures and demultiplexed events in the cache.

Another implementation of the disclosed method includes tracking a count of queries for each subscribed to channel; and using the count to identify channels for which to maintain the pointer structures. When a count of queries for an identified channel diminishes to zero, the disclosed method can continue maintaining a corresponding pointer structure for a predetermined time period to allow for re-requests.

In one implementation, the disclosed method further includes for each active physical aggregate channel, tracking an end event identifier (ID) that represents a latest event harvested to the cache; and based on the tracking, identifying a start event ID from which to begin subsequent block demultiplexing and harvesting.

In another implementation, the disclosed method includes tracking active physical aggregate channels; and based on the tracking, identifying active physical aggregate channels for subsequent block demultiplexing and harvesting.

In some implementations, the pointer structures are cached in a JAVA virtual machine heap. For one implementation, the disclosed method further includes conserving cache capacity by harvesting a subset of the identified demultiplexed events for certain low-throughput channels.

In some implementations, the disclosed method includes repeating the demuxing at ten to two hundred millisecond intervals.

For one implementation of the disclosed method eighty five to ninety five percent of events delivered responsive to replay access requests are already present in the cache, including responding to the replay access requests and responsively delivering events from the event cache memory using the established starting point for the replay and the events present in the event cache memory, without requiring real-time redundant demuxing of requested events.

For one implementation of the disclosed method the cache lists include a first cache list for a low-throughput stream with a streaming rate of zero to one event per minute and a second cache list for a high-throughput stream with a streaming rate of one to 10 million events per minute.

Some implementations of the disclosed method further include batching cache miss-causing replay access requests that request events from a same physical aggregate channel, wherein a cache miss-causing replay access request is a request for events not already present in the cache; and demuxing events in the physical aggregate channel, producing demuxed events, and caching the demuxed events into event cache memory responsive to the batch of cache miss-causing replay access requests.

One implementation of the disclosed method also includes tracking a count of active subscribers for each channel; and using the count to identify the number of channels for which to maintain the cache lists.

In some disclosed implementations, the method further includes, when a count of active subscribers for a channel diminishes to zero, continuing to maintain a corresponding cache list for a predetermined time period to allow for subscribers to re-subscribe. In some implementations the cache lists are stored in a Java Virtual Machine heap.

Yet another implementation of the disclosed method further includes demuxing events in the physical aggregate channel, producing demuxed events, and caching the demuxed events into event cache memory on a batch-by-batch basis.

Other implementations of the method described in this section can include a tangible non-transitory computer readable storage medium impressed with computer program instructions executable by a processor, the instructions, when executed on a processor, implement actions comprising any of the methods described above.

Yet another implementation of the method described in this section can include a system including memory loaded with computer program instructions and one or more processors operable to execute instructions, stored in the memory, the instructions, when executed on the processors, perform any of the methods described above.

This system implementation and other systems disclosed optionally include one or more of the features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim as follows:

1. A method of reducing computational complexity and latency when responding to queries for events multiplexed through a hierarchy of injection channels, intermediate aggregate channels, and physical aggregate channels, the method comprising:

multiplexing events through a hierarchy of injection channels, intermediate aggregate channels, and physical aggregate channels, wherein events in the physical aggregate channels are persisted in storage;

receiving a multitude of queries for events, wherein each query requests events multiplexed from at least one channel in the hierarchy;

establishing separate pointer structures for subscribed to channels, wherein the pointer structures reference, for the respective subscribed to channels, demultiplexed events harvested to a cache from one or more active physical aggregate channels, wherein an active physical aggregate channel is a physical aggregate channel that has events multiplexed from at least one requested, unique channel;

block demultiplexing events in the active physical aggregate channels;

based on the block demultiplexing, identifying events multiplexed from the respective subscribed to channels and not previously harvested to the cache;

harvesting the identified demultiplexed events from the active physical aggregate channels to the cache and updating the pointer structures to reference, for the respective requested, unique channels, the harvested demultiplexed events; and responding to the queries using the pointer structures and the demultiplexed events in the cache, without requiring separate demultiplexing and harvesting for each of the queries.

2. The method of claim 1, wherein the active physical aggregate channels have events multiplexed from subscribed to channels and channels without subscribers.

3. The method of claim 1, further comprising repeating the block demultiplexing and the harvesting at ten to two hundred millisecond intervals.

4. The method of claim 1, wherein eighty five to ninety five percent replay queries request events already present in the cache, further comprising:
responding to the replay queries using the established pointer structures and pre-demultiplexed events in the cache, without requiring separate demultiplexing and harvesting of the requested events.

5. The method of claim 1, wherein a first query requests events multiplexed from a first channel and already present in the cache, further comprising:
identifying a first pointer structure established for the first channel;
retrieving, from the cache, pre-demultiplexed events referenced by the first pointer structure and responsive to the first query; and
responding to the first query with the retrieved pre-demultiplexed events, without requiring real-time demultiplexing and harvesting of requested events or requiring real-time redundant demultiplexing of events multiplexed from non-requested channels that share an active physical aggregate channel with the first channel.

6. The method of claim 5, wherein the first channel is a low-throughput channel with a streaming rate of one to ten events per minute and one other channel is a high-throughput channel with a streaming rate of one to ten million events per minute.

7. The method of claim 1, further comprising:
batching cache miss-causing replay queries that request events from a same physical aggregate channel, wherein a cache miss-causing replay query is a replay query that requests events not already present in the cache;
block demultiplexing events in the physical aggregate channel to produce old demultiplexed events; and
responding to the cache miss-causing replay queries by harvesting from the old demultiplexed events, the events responsive to the cache miss-causing replay queries, until the old demultiplexed events catch up with events already present in the cache, then continuing to respond using the pointer structures and demultiplexed events in the cache.

8. The method of claim 1, further comprising:
tracking a count of queries for each subscribed to channel; and
using the count to identify channels for which to maintain the pointer structures.

9. The method of claim 1, further comprising:
when a count of queries for an identified channel diminishes to zero, continue maintaining a corresponding pointer structure for a predetermined time period to allow for re-requests.

10. The method of claim 1, further comprising:
for each active physical aggregate channel, tracking an end event identifier (ID) that represents a latest event harvested to the cache; and
based on the tracking, identifying a start event ID from which to begin subsequent block demultiplexing and harvesting.

11. The method of claim 1, further comprising:
tracking active physical aggregate channels; and
based on the tracking, identifying active physical aggregate channels for subsequent block demultiplexing and harvesting.

12. The method of claim 11, further comprising conserving cache capacity by harvesting a subset of the identified demultiplexed events for certain low-throughput channels.

13. A system, comprising memory loaded with computer program instructions and one or more processors operable to execute instructions stored in the memory, the instructions, when executed on the processors, implement a method of accelerating replay access to numerous streams via a channel aggregation hierarchy, comprising:
multiplexing events through a hierarchy of injection channels, intermediate aggregate channels, and physical aggregate channels, wherein events in the physical aggregate channels are persisted in storage;
receiving a multitude of queries for events, wherein each query requests events multiplexed from at least one channel in the hierarchy;
establishing separate pointer structures for subscribed to channels, wherein the pointer structures reference, for the respective subscribed to channels, demultiplexed events harvested to a cache from one or more active physical aggregate channels, wherein an active physical aggregate channel is a physical aggregate channel that has events multiplexed from at least one requested, unique channel;
block demultiplexing events in the active physical aggregate channels;
based on the block demultiplexing, identifying events multiplexed from the respective subscribed to channels and not previously harvested to the cache;
harvesting the identified demultiplexed events from the active physical aggregate channels to the cache and updating the pointer structures to reference, for the respective requested, unique channels, the harvested demultiplexed events; and
responding to the queries using the pointer structures and the demultiplexed events in the cache, without requiring separate demultiplexing and harvesting for each of the queries.

14. The system of claim 13, wherein the active physical aggregate channels have events multiplexed from subscribed to channels and channels without subscribers.

15. The system of claim 13, wherein the method of accelerating replay access to numerous streams via a channel aggregation hierarchy implemented by the instructions further comprises repeating the block demultiplexing and the harvesting at ten to two hundred millisecond intervals.

16. The system of claim 13, wherein eighty five to ninety five percent replay queries request events already present in the cache, and wherein the method of accelerating replay access to numerous streams via a channel aggregation hierarchy implemented by the instructions further comprises:
responding to the replay queries using the established pointer structures and pre-demultiplexed events in the cache, without requiring separate demultiplexing and harvesting of the requested events.

17. The system of claim 13, wherein a first query requests events multiplexed from a first channel and already present in the cache and wherein the method of accelerating replay access to numerous streams via a channel aggregation hierarchy implemented by the instructions further comprises:

identifying a first pointer structure established for the first channel;

retrieving, from the cache, pre-demultiplexed events referenced by the first pointer structure and responsive to the first query; and     responding to the first query with the retrieved pre-demultiplexed events, without requiring real-time demultiplexing and harvesting of requested events or requiring real-time redundant demultiplexing of events multiplexed from non-requested channels that share an active physical aggregate channel with the first channel.

18. The system of claim 17, wherein the first channel is a low-throughput channel with a streaming rate of one to ten events per minute and one other channel is a high-throughput channel with a streaming rate of one to ten million events per minute.

19. The system of claim 13, wherein the method of accelerating replay access to numerous streams via a channel aggregation hierarchy implemented by the instructions further comprises:

batching cache miss-causing replay queries that request events from a same physical aggregate channel, wherein a cache miss-causing replay query is a replay query that requests events not already present in the cache;

block demultiplexing events in the physical aggregate channel to produce old demultiplexed events; and     responding to the cache miss-causing replay queries by harvesting from the old demultiplexed events, the events responsive to the cache miss-causing replay queries, until the old demultiplexed events catch up with events already present in the cache, then continuing to respond using the pointer structures and demultiplexed events in the cache.

20. The system of claim 13, wherein the method of accelerating replay access to numerous streams via a channel aggregation hierarchy implemented by the instructions further comprises:

tracking a count of queries for each subscribed to channel; and     using the count to identify channels for which to maintain the pointer structures.

* * * * *